United States Patent [19]
Harbage

[11] 3,908,401
[45] Sept. 30, 1975

[54] TORSIONALLY AND/OR AXIAL SOFT COUPLING

[75] Inventor: Alfred B. Harbage, Severna Park, Md.

[73] Assignee: The United States of America as represented by the Secretary of the Navy, Washington, D.C.

[22] Filed: June 20, 1974

[21] Appl. No.: 481,007

[52] U.S. Cl. .............. 64/27 NM; 64/11 R; 64/1 V
[51] Int. Cl.² .......................................... F16D 3/14
[58] Field of Search ........ 64/8, 11 R, 27 NM, 27 R, 64/19, 12, 23, 1 V

[56] References Cited
UNITED STATES PATENTS

| 1,864,080 | 6/1932 | Madge | 64/11 R |
| 2,366,502 | 1/1945 | Fitzgerald | 64/27 NM |
| 2,790,312 | 4/1957 | Hagenlocher et al. | 64/11 |
| 3,146,612 | 9/1964 | Lorenz | 64/11 |
| 3,702,067 | 11/1972 | Stewart | 64/27 |

Primary Examiner—Samuel Scott
Assistant Examiner—Randall Heald
Attorney, Agent, or Firm—R. S. Sciascia; Q. E. Hodges

[57] ABSTRACT

A flexible rotary shaft coupling for marine use in a propeller shaft that isolates the vibration caused by axial forces on the propeller passing through an uneven wake. Torque is carried by a solid pin and link arrangement which produces negligible axial resistance. The coupling housing is substantially cup-shaped on one side and has a plunger on the other side and contains a very dense liquid or a very dense soft rubber mass formed to a hollow cylindrical shape within the coupling due to centrifugal force. This mass resists the fluctuating forces by the variation of the inside diameter of the hollow cylinder formed by centrifugal forces during rotation. Variation of stiffness of the cylindrical column is achieved by varying the distance between the coupling faces or sides.

7 Claims, 2 Drawing Figures

TORSIONALLY AND/OR AXIAL SOFT COUPLING

The invention described herein may be manufactured and used by or for the Government of the United States of America for governmental purposes without the payment of any royalties thereon or therefor.

BACKGROUND OF THE INVENTION

The instant invention relates generally to flexible rotary shaft couplings and more particularly to a marine propeller shaft coupling that is torsional hard and axially soft.

Flexible shaft couplings are used generally for a variety of reasons such as for transmitting torque between shafts that are not maintained in axial alignment, and for isolating or absorbing vibrations created by the power driving means or the driven means. Most flexible shaft couplings are therefor designed to be both torsionally and axially resilient to compensate for such problems.

There are problems encountered, however in the design of soft couplings for transmitting high power. In particular, the coupling must be made impracticably large to transmit the power and to release the heat buildup caused by absorbing power fluctuations, vibration, and flexing.

Another problem, particularly related to marine propulsion is that screw propellers of the ship do not encounter smooth waters. Rather they often encounter rough water created by a variety of man-made and natural causes such as currents, wave action, wakes of ships previously passing through the same water, and by its own wake created by the forward hull form. Thus the propellers pass through water having various motions and velocities which causes the propeller to "bite" variably hard and then soft, and to vary in rotational speed. This results in varying axial forces on the propeller and shaft resulting in vibration in the propulsion system and ship which is uncomforatble, noise producing, and possibly damaging.

There has been little effort expanded to alleviate these problems except for designing larger and heavier couplings to transmit the power. The coupling has to be made undesirably larger and heavier, particularly when they are designed to be both torsionally and axially soft.

SUMMARY OF THE INVENTION

Accordingly, an object of the instant invention is to provide a new and improved flexible rotary shaft coupling.

Another object of the present invention is to provide an improved propeller shaft coupling for isolating vibrations.

Still another object of the instant invention is to provide a propeller shaft coupling that is torsionally hard and axially soft.

A further object of the instant invention is to provide a soft rotary shaft coupling of relatively small size capable of transmitting a large amount of torque.

A still further object of the instant invention is to provide axial isolation of a marine propeller and shafting from the driving components when passing through an uneven wave.

Briefly, these and other objects of the instant invention are attained by the use of a soft rotary shaft coupling having a link and pin arrangement for transmitting torque and which does not restrict axial movement. One side of the housing of the shaft coupling is substantially cup-shaped and the other side is a plunger fitting within the cup-shaped side. The cup-shaped side contains a very dense soft rubber or dense liquid mass contacting the inside of the cup and the inside face of the plunger of the other side of the coupling.

BRIEF DESCRIPTION OF THE DRAWINGS

A more complete understanding of the invention and many of the attendant advantages thereof will be readily appreciated as the same become better understood by reference to the following detailed description when considered in connection with the accompanying drawings wherein.

DESCRIPTION OF THE PREFERRED EMBODIMENT

Figure 1:
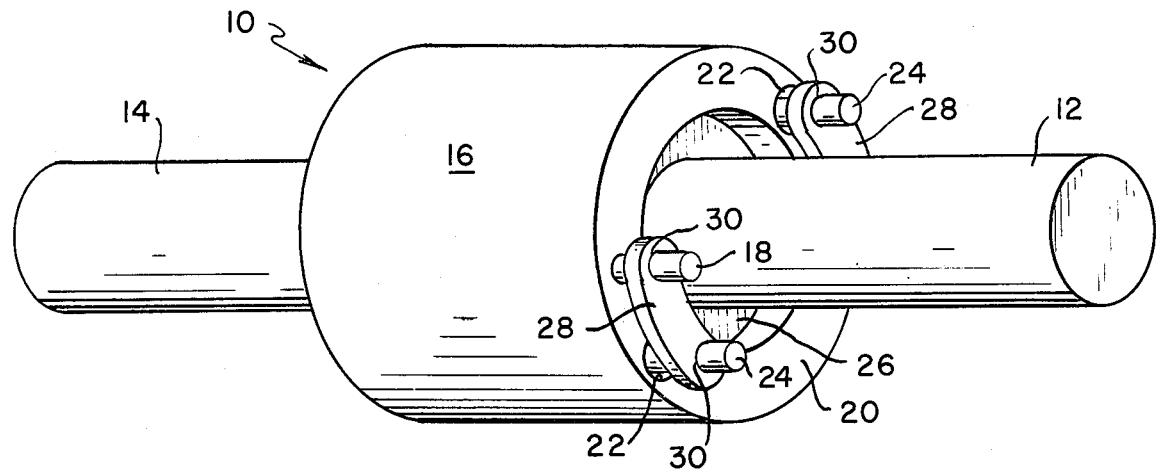
FIG. 1 is a perspective view of the flexible rotary shaft coupling.

Referring now to the drawings, wherein like reference numerals designate corresponding parts throughout the several views, there is shown in FIG. 1, a flexible rotary shaft coupling 10 connected between a driving shaft 12 and a driven shaft 14. A cup-shaped housing 16 is connected to the driven shaft 14 and has a plurality (two shown) of pins 18 attached and extending axially from an inwardly turned lip 20 of the housing 16. Adjacent the pins 18 and angularly displaced around the lip 20 are a plurality of axial bores 22 extending through the lip. Protruding through the bores 22 are a plurality of pins (two shown) 24 which are attached and axially extend from a plunger shaped side 26 which is connected to the driving shaft 12. Connecting the pins 18 of the driven side and the pins 24 of the driving side, are a plurality (two shown) of links 28. These links 28 have holes 30 in each end which permit relative axial sliding motion over the pins 18 and 24. Alternative constructions are obviously possible. For example, the cup-shaped side may have a plurality of slots along the sides running parallel to the axis. The plunger side may then have radially extending pins around its periphery coacting in the slots of the cup-shaped side to provide a hard coupling in torsion. This construction would permit relative axial sliding motion of the pins in the slots with insignificant axial resistance.

Figure 2:
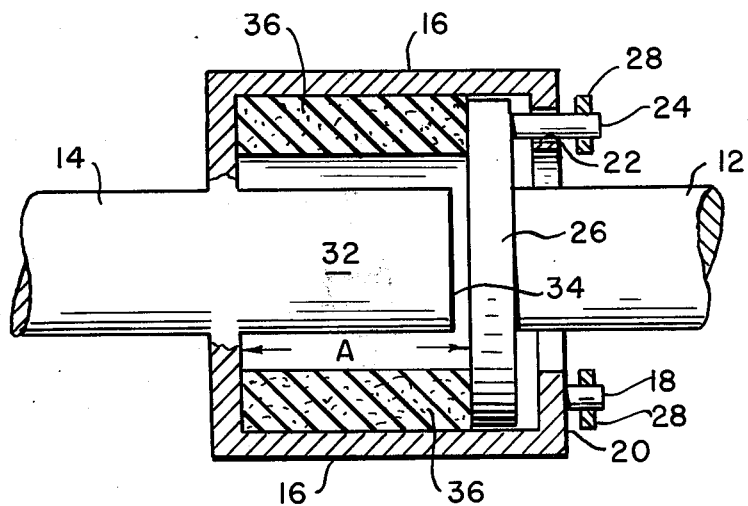
FIG. 2 is a cross section along the plane of the axis of the coupling showing the isolating material.

Referring now to FIG. 2, the pins 24 are shown attached to the plunger side 26 and extending through the bores 22. Extending coaxially in the cup-shaped end and attached to the driven shaft is a stub-shaft 32 having an end 34 adjacent the inside of plunger 26. The plunger is shown to be in slidable relationship with the inside of the cup-shaped end 16. Within the diameter of the cup 16 is a deformable mass 36 which may be a very dense soft rubber or a very dense liquid. The rubber may be made dense by having lead, iron, or tungsten particles molded therein, and the liquid may be mercury, or the like.

In the discussion of the operation, it is to be understood that torque is transmitted through the links 28 and pins 18 and 24 which produce negligible axial resistance. Axial forces are absorbed by mass 36. Mathematically, in a propulsion system propeller thrust is equal to the product of a constant and the square of the rotational speed. Also, the axial separating force on the coupling due to the flow of the mass 36 is approximately equal to the product of a constant and the square of the rotational speed. This invention makes use of this knowledge and equates at all rotational speeds the axial separating force on the coupling, caused by the flow of the deformable mass due to the rotational forces, with the thrust force from the propeller. It is to be understood that at rotational speeds, the deformable mass 36 is thrown to the outside of the cup-shaped housing 16 by centrifugal force. Having no place to flow radially, the mass 36 tends to flow axially and exerts force on the plunger 26 to separate the sides of the coupling 10. As the mass flows to separate the coupling its inside diameter increases to decrease the size of the hollow cylinder or column mass. This separating force is equal and opposite at all speeds to the thrust force on the propeller shaft which tends to close together the coupling sides. The forces are balanced for all rotational speeds, and any force fluctuations, as by the propeller going through an uneven wake, are axially resisted by variation of the inside diameter of the deformable mass 36. This inside diameter, and this stiffness, changes as the distance A shown in FIG. 2, between the coupling faces varies due to instantaneous variations in thrust. During astern propeller rotation, plunger 26 strikes the inside of lip 20. The end 34 of shaft 32 acts as a thrust limit stop and when it abuts the plunger 26 the coupling becomes a hard coupling.

Obviously many modifications and variations of the present invention are possible in light of the above teachings. It is therefore to be understood that within the scope of the appended claim, the invention may be practiced otherwise than as specifically described.

What is claimed is:

1. A soft shaft coupling for use in a marine propeller shaft comprising:

a cup-shaped side attached to the driven shaft;

a plunger-shaped side coupled with said cup-shaped side and attached to the driving shaft;

a pin and link arrangement hard coupling said sides together torsionally; and a deformable dense mass activated by centrifugal force, soft coupling said sides together axially and contained with said cup shaped side, whereby the propeller thrust tending to close the coupling is equal and opposite to the force of the dense mass acted on by rotationally induced force, tending to separate the coupling at all rotational speeds.

2. The soft shaft coupling of claim 1 wherein said pin and link arrangement further comprises:

a plurality of driven pins attached and radially extending from said cup-shaped side;

a plurality of driving pins attached and radially extending from said plunger shaped side; and a plurality of links connecting said driving pins with said driven pins in a slidable relationship.

3. The soft shaft coupling of claim 2 wherein said deformable mass comprises:

a very dense soft rubber.

4. The soft shaft coupling of claim 3 wherein said deformable mass comprises:

a soft flowable rubber material mixed with particles of heavy metal.

5. The soft shaft coupling of claim 2 wherein said deformable mass comprises:

a dense liquid.

6. The soft shaft coupling of claim 5 wherein said dense liquid is mercury.

7. The soft shaft coupling of claim 2 further comprising:

an thrust limiting stop connected inside said cup-shaped side.

* * * * *